US008272021B2

(12) United States Patent
Youn et al.

(10) Patent No.: US 8,272,021 B2
(45) Date of Patent: Sep. 18, 2012

(54) METHOD FOR TRANSMITTING NEAR VIDEO ON DEMAND (NVOD) USING CATCH AND REST (CAR) AND SUB-CHANNELS

(75) Inventors: Hee Yong Youn, Seongnam (KR); Jong Ik Jang, Incheon (KR)

(73) Assignee: Sungkyunkwan University Foundation for Corporate Collaboration, Gyeonggi-do (KR)

( * ) Notice: Subject to any disclaimer, the term of this patent is extended or adjusted under 35 U.S.C. 154(b) by 502 days.

(21) Appl. No.: 12/582,676

(22) Filed: Oct. 20, 2009

(65) Prior Publication Data

US 2010/0186054 A1 Jul. 22, 2010

(30) Foreign Application Priority Data

Oct. 22, 2008 (KR) ........................ 10-2008-0103733

(51) Int. Cl.
*H04N 7/173* (2011.01)
(52) U.S. Cl. ........................... 725/103; 725/95; 725/101
(58) Field of Classification Search .................. None
See application file for complete search history.

(56) References Cited

U.S. PATENT DOCUMENTS

2006/0095948 A1* 5/2006 Verhaegh et al. ............. 725/101

OTHER PUBLICATIONS

CAR: A Low Latency Video-on-Demand Braodcasting Scheme for Heterogeneous Receivers. Lin, Chin-Tsai. Ding, Jen-Wen. IEEE Transactions on broadcasting. vol. 52, No. 3 (Sep. 2006).*
Harmonic Broadcasting for Video-on-Demand Service. Juhn, Li-Shen. Tseng, Li-Ming. IEEE Transactions on broadcasting. vol. 43, No. 3 (Sep. 1997).*

* cited by examiner

*Primary Examiner* — Brian Pendleton
*Assistant Examiner* — Jason K Lin
(74) *Attorney, Agent, or Firm* — Martine Penilla Group, LLP

(57) ABSTRACT

The present invention discloses a method for transmitting Near Video on Demand (NVoD) using Catch and Rest (CAR) and sub-channels which includes: dividing an L-sized content into N segments using the CAR broadcasting scheme, allocating the segments to K channels including a replicate channel, and broadcasting the segments; dividing a first segment $S_1^R$ ($S_i^R$ represents an i-th segment of a regular channel) into $N^{sb}$ sub-segments again at given bandwidth using the harmonic broadcasting scheme, and dividing an i-th sub-segment $S_i^{sb}$ into i segments again; broadcasting the sub-segments $\{S_{i,1}^{sb}, \ldots, S_{i,i}^{sb}\}$ in n sub-channels; and adding the segments $\{S_2^R, \ldots, S_N^R\}$ to a sub-layer and broadcasting the segments, the first segment broadcast in the first channel being divided and allocated to a few sub-channels, the succeeding segments broadcast in the other channels being just shifted and broadcast.

4 Claims, 5 Drawing Sheets

METHOD FOR TRANSMITTING NEAR VIDEO ON DEMAND (NVOD) USING CATCH AND REST (CAR) AND SUB-CHANNELS

BACKGROUND OF THE INVENTION

1. Field of the Invention

The present invention relates to a method for transmitting Video on Demand (VoD), and more particularly, to a method for transmitting Near Video on Demand (NVoD) using Catch and Rest (CAR) and sub-channels which can reduce service latency for high-end terminals.

2. Description of the Related Art

With the rapid development of communication and network technologies in recent years, Video on Demand (VoD) has been considered as a promising service which enables the users to request and play the desired multimedia contents. There exist many ongoing researches focusing on efficient transmission of VoD.

The transmission methods for VoD can be classified into True VoD (TVoD) and Near VoD (NVoD).

With TVoD, the users can be serviced with the desired contents immediately upon request at anytime. However, since the users are serviced via unicast, it is not efficient in terms of bandwidth utilization when multiple users request the same content.

On the contrary, NVoD uses multicasting which is suitable for providing a same service to multiple users. Unlike TVoD, however, service latency is high which means that the users have to wait for some time period after they make a request. Moreover, unlike TVoD, NVoD does not provide VCR function. Despite these drawbacks, high bandwidth efficiency makes NVoD a good candidate for servicing highly popular contents to a large number of users.

The transmission methods employed for NVoD can be classified into three types: batching, patching and periodic broadcasting.

The batching scheme puts the user requests for the same video into a single "batch" which arrive close in time, and provides service to the users in the batch by sending the video via a single multicast channel. The patching scheme allows late arriving users to join an ongoing multicast channel and sends the missing portion of the video of the earlier part via unicast. With the periodic broadcasting scheme, a single VoD content is divided into segments which are periodically broadcast on different channels. Compared to the former two schemes, respective video streams are allocated to fixed channels. Therefore, it is effective for popular contents of many simultaneous requests.

The existing broadcasting schemes such as Fast Broadcasting, Pagoda Broadcasting, Harmonic Broadcasting effectively reduce the service latency, which refers to the time between the request for VoD and the playing of the contents. The schemes above assume that the terminal has unlimited bandwidth and buffer capacity. This is unrealistic in the wireless/wired convergence environment where terminals have different capabilities.

Accordingly, so as to effectively support heterogeneous terminals, new broadcasting schemes such as HeRo, Broad-Catch and Catch and Rest (CAR) have been introduced. These scheduling schemes' allocate different bandwidth to the time slots of the segments, so that each terminal can choose the time slot to start receiving the VoD contents according to its capability.

Among these schemes, CAR allows small service latency and buffer space requirement especially for low-end terminals. However, use of replicated channels in CAR makes the segment size relatively large, which results in increased service latency for high-end terminals.

SUMMARY OF THE INVENTION

The present invention has been made in an effort to solve the aforementioned problems associated with the prior art. An object of the present invention is to provide a method for transmitting Near Video on Demand (NVoD) using Catch and Rest (CAR) and sub-channels which can reduce service latency for high-end terminals by dividing a first segment determining the service latency of the high-end terminals into smaller segments using the bandwidth-efficient harmonic broadcasting scheme and broadcasting the segments through the sub-channels.

According to an aspect of the present invention for achieving the object, there is provided a method for transmitting Near Video on Demand (NVoD) using Catch and Rest (CAR) and sub-channels, the method including: dividing an L-sized content into N segments using the CAR broadcasting scheme, allocating the segments to K channels including, a replicate channel, and broadcasting the segments; dividing a first segment $S_1^R$ ($S_i^R$ represents, an i-th segment of a regular channel) into $N^{sb}$ sub-segments at given bandwidth using the harmonic broadcasting scheme, and dividing an i-th sub-segment $S_i^{sb}$ into i segments again; broadcasting the sub-segments $\{S_{i,1}^{sb}, \ldots, S_{i,i}^{sb}\}$ in n sub-channels; and adding the segments $\{S_2^R, \ldots, S_N^R\}$ to a sub-layer and broadcasting the segments, the first segment broadcast in the first channel being divided and allocated to a few sub-channels, the succeeding segments broadcast in the other channels being just shifted and broadcast.

As described above, according to the present invention, it is possible to reduce the service latency for the high-end terminals by generating the sub-layer of sub-channels broadcasting the first segment in a divided manner using the harmonic broadcasting scheduling scheme, apart from a base layer, and adding the sub-layer to the broadband networks of sufficient resources.

BRIEF DESCRIPTION OF THE DRAWINGS

The above and other objects, features and advantages of the present invention will become apparent from the following description of a preferred embodiment given in conjunction with the accompanying drawings, in which.

DESCRIPTION OF THE PREFERRED EMBODIMENT

Figure 1:
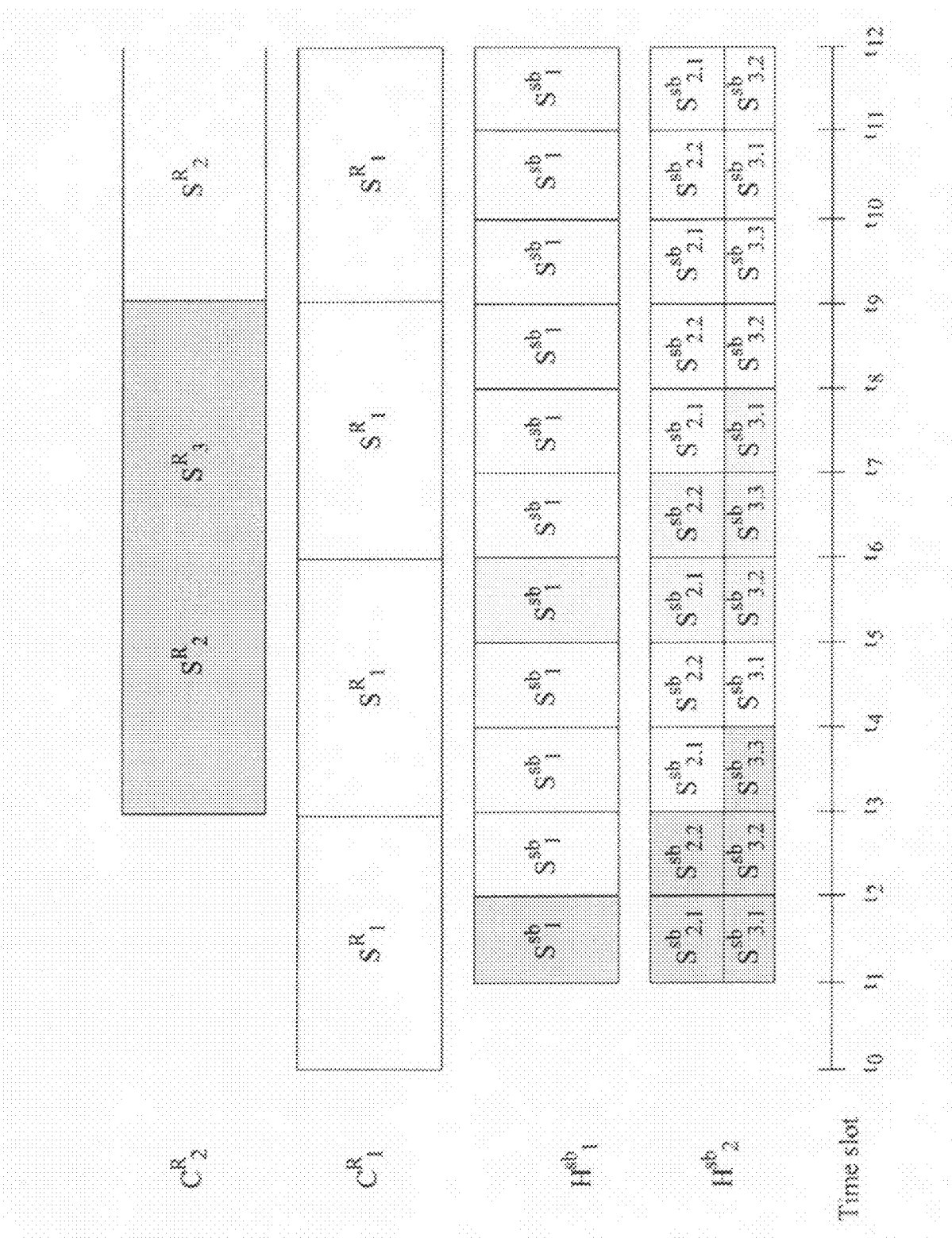
FIG. 1 is an exemplary view of sub-channels which broadcast divided segments using a harmonic scheduling scheme according to the present invention.

Hereinafter, a preferred embodiment of a method for transmitting Near Video on Demand (NVoD) using Catch and Rest (CAR) and sub-channels according to the present invention will be described in detail with reference to the accompanying drawings.

First, a harmonic broadcasting scheme and a CAR broadcasting scheme which are the basis of the present invention will be described.

Harmonic broadcasting is one of the efficient periodic broadcasting schemes in terms of bandwidth utilization. In this scheme, a video L is divided into N segments and an i-th segment $S_i$ is further divided into i equal-sized sub-segments. The divided sub-segments are broadcast in respective channels. If it is assumed that the channel bandwidth required to send $S_1$ is b, the bandwidth required by each channel is b/i. The total bandwidth required becomes $H_N*b$, where $H_N$ stands for the total number of channels divided by the harmonic scheme and $$H_N = \sum_{n=1}^{N} \frac{1}{n}.$$

Therefore, if data are broadcast using three channels having a bandwidth of b, the number N of the divided segments is ten.

CAR is a scheduling method using the Fibonacci broadcasting scheme and replicated channels of the HeRo scheme. Here, when D is a period in which a certain set of segments is sent repeatedly in one channel, the replicated channel copies the last channel i, shifts the segments by $D_i/2$, and re-broadcasts them. It is used to minimize the bandwidth requirement and service latency of terminals.

In the CAR broadcasting scheme, it is assumed that L represents the entire length of the content, N the total number of segments, K the number of server channels, and R the replicated channel. First, the content is divided into equal-size segments ($N=2^{K-2R-3}[3(2^{R+1}-1)+4]-1$). Period(i) in which a certain set of segments are repeatedly sent in a channel i is represented by the following equation:

$$Period(i) = \begin{cases} 1 & \text{if } i = 1 \\ 2 \times Period(i-1) & \text{if } 2 \le i \le K - 2R - 1 \\ 3/2 \times Period(i-1) & \text{if } i = K - 2R \end{cases}$$

The segments are broadcast repeatedly through each channel using the period. If $R \geq 0$, a channel of K−2R is referred to as a modified channel. The period of original channels and their shifted channels increases by a multiple of two of the period of the modified channel.

When the terminal has sufficient bandwidth and buffer capacity, it receives segments by the following procedure.

The terminal always starts receiving the first segment from the first channel. As the download continues in the current i-th channel $C_i$, the terminal does not move onto the next channel $C_{i+1}$ and start receiving the first segment from the next channel $C_{i+1}$ unless it has received all the segments from the current i-th channel $C_i$. In other words, the terminal starts receiving the first segment from the next channel only when it cannot maintain sequential, seamless downloading of the segments. Except for the last shifted channel, the terminal does not jump from $C_i$ to $C_{i+2}$ during downloading.

As mentioned above, while CAR allows low service latency for low-end terminals, it cannot reduce service latency for high-end terminals due to relatively large-size segments. This problem can be more or less solved by increasing the number of channels. However, if the number of the channels is over a predetermined value, there is no advantage for the low-end terminals. Further, it is inefficient for the wireless networks of limited resources.

On the contrary, a small number of channels are ineffective for broadband cable networks of sufficient resources where a relatively large number of high-end terminals exist.

Therefore, according to the present invention, it is possible to reduce the service latency for the high-end terminals by generating a sub-layer of sub-channels broadcasting the first segment in a divided manner using the harmonic broadcasting scheduling scheme, apart from a base layer containing original channels, and adding the sub-layer to the broadband networks of sufficient resources.

Hereinafter, an embodiment of the present invention will be described in detail with reference to the accompanying drawings.

A server schedules one VoD content and transmits the VoD content to a terminal as described below.

$S_i^R$ represents an i-th segment of a regular channel, $S_i^{sb}$ an i-th segment of re-divided $S_i^R$, and $H^{sb}$ a sub-channel for broadcasting the divided segments $\{S_1^{sb}, \ldots, S_N^{sb}\}$.

First, the L-sized content is divided into N segments using the CAR broadcasting scheme, allocated to K channels including a replicate (R) channel, and broadcast.

Next, a first segment $S_1^R$ is divided into $N^{sb}$ sub-segments again at given bandwidth using the harmonic broadcasting scheme, and an i-th sub-segment $S_i^{sb}$ is divided into i segments again.

Thereafter, the sub-segments $\{S_{i,1}^{sb}, \ldots, S_{i,i}^{sb}\}$ are broadcast in n sub-channels.

FIG. 1 shows an example in which the first segment $S_1^R$ is divided into three sub-segments and $H_N^{sb}=2$ with a channel size of b.

Then, sub-segments $\{S_2^R, \ldots, S_N^R\}$ should be added to the sub-layer and broadcast. While the first segment broadcast in the first channel is divided and allocated to a few sub-channels, the succeeding segments broadcast in the other channels are just shifted and broadcast. Here, $\{H_1^{sb}, \ldots, H_N^{sb}\}$ are shifted by $S_1^{sb}$, and the other sub-channels are shifted by Offset(i) represented by the following equation:

$$Offset(i) = \begin{cases} 2 \times Period^R(i-1) & \text{if } 2 \le i \le K - 2R - 1 \\ Offset(i-1) + 3 \times Period^R(i-1) & \text{if } i = K - 2R \\ Offset(i-1) + Period^R(i-1) & \text{in other cases} \end{cases}$$

wherein $Period^R(i)$ is a period of a regular channel to which each of i-th sub-channels corresponds. However, if R>0, the first replicate channel needs not to be transmitted to the sub-channel.

Figure 2:
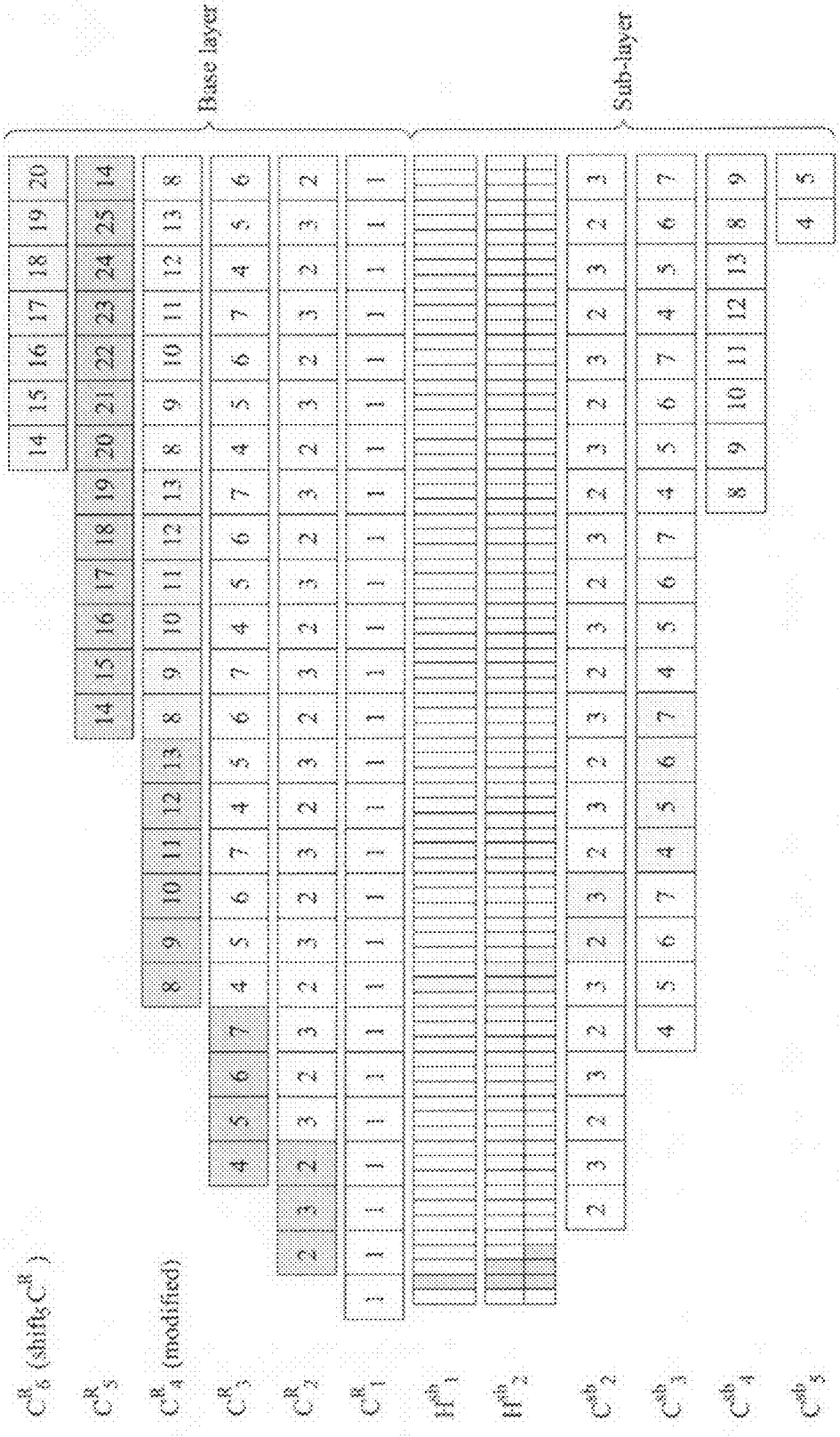
FIG. 2 is an exemplary view of regular channels for K=6, R=1 and $H_N^{sb}$=2 and other sub-channels.

FIG. 2 shows an example in which the segments are broadcast including all the sub-channels when K=6, R=1 and $H_N^{sb}=2$.

If all the sub-channels are added to the sub-layer, when bandwidth of one channel is b, the total bandwidth B needed is represented by the following equation:

$$B = \begin{cases} (2K + H_N^{sb} - 2) \times b & \text{if } R > 0 \\ (2K + H_N^{sb} - 1) \times b & \text{if } R = 0 \end{cases}$$

This bandwidth requirement might be unnecessary in the wireless network where the resources are limited and a large number of low-end terminals exist. However, it is effective for broadband cable networks where a relatively large number of high-end terminals exist. Accordingly, if the resources are not enough, intermediate nodes such as routers or base stations can filter the sub-channels to broadcast the segments according to the network status and the performance of the terminals belonging to the network.

Meanwhile, the terminal receives the video segments as described below.

According to the present invention, the segment reception schedule for the terminal is simple. When the user wants to watch video, if the terminal can receive the first segment $S_1^{sb}$ of the sub-channel earlier than the first segment $S_1^R$ of the main channel, it receives $S_1^R$ through the sub-channel. Then, the terminal receives the segments through the regular channel based on the CAR reception schedule.

When it is assumed that the terminal arrives at a time slot t1, if the terminal has enough bandwidth, it starts receiving the first segment through $\{H_1^{sb}, \ldots, H_N^{sb}\}$ without waiting for a time slot t3. Then, the terminal receives the segments from the second sub-channel and the second channel of the base layer from t3 at the same time. Afterwards, the terminal leaves the sub-layer at t4 and receives the rest of the segments through the main channel. Referring to FIG. 1, when the terminal starts receiving the segments of the sub-channel at t5, it completes reception of the entire first segment at t8. However, the terminal should receive the second segment from the very next channel. Since the second segment is broadcast at t9, there is a difference between the segments which corresponds to one time slot. Accordingly, the terminal must receive the segments through the sub-channels until this problem is solved, and then enter the regular channel. In FIG. 2, a terminal requesting a video at t1 misses the first segment of the first regular channel, and thus starts receiving the first segment from the sub-channels $H_1^{sb}$ and $H_2^{sb}$. Thereafter, the terminal receives the rest of the segments from the regular channel. Moreover, a terminal arriving at t2 starts receiving the segments from the sub-channels $H_1^{sb}$ and $H_2^{sb}$, but cannot receive the second packet on time from the regular channel due to a gap. Therefore, after receiving the seventh segment through $C_2^{sb}$ and $C_3^{sb}$, the terminal receives the segments through the regular channel.

According to the present invention, the service latency of the terminal depends on the size of the first segment. When the number of the channels is obtained using $$H_N = \sum_{n=1}^{N} \frac{1}{n},$$

which is the equation for calculating the number of the channels in the harmonic broadcasting scheme, the number of the segments is $e^{H_N - C}$. Here, e stands for a transcendental number and C stands for the Euler-Mascheroni constant. If the number of the segments of the sub-channel is $N_{sb}$ and the number of the segments of the regular channel is $N_R$, the maximum service latency d for the terminal is represented by the following equation:

$$d = \frac{L}{(2^{K-2R-3}(3(2^{R+1}-1)+4)-1) \times e^{H_N^{sb}-C}} = \frac{L}{N_R \times N_{sb}}$$

The bandwidth requirement for the terminal to use the sub-channels depends on $H_N^{sb}$. If br(K,R,t) is the bandwidth at the broadcasting time of the first segment of the regular channel just after the arriving time of the terminal, the bandwidth needed is as follows:

$$br(K,R,t) - H_N^{sb} - 1$$

Figure 3:
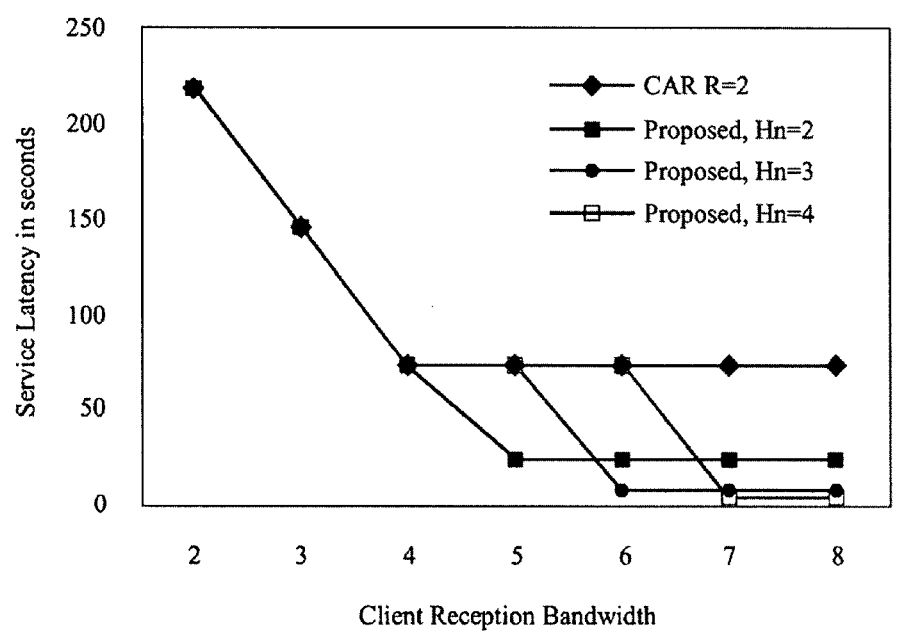
FIG. 3 is a graph showing the comparison using the CAR (R=2) scheme and the number of $H_N^{sb}$ according to the present invention.
Figure 4:
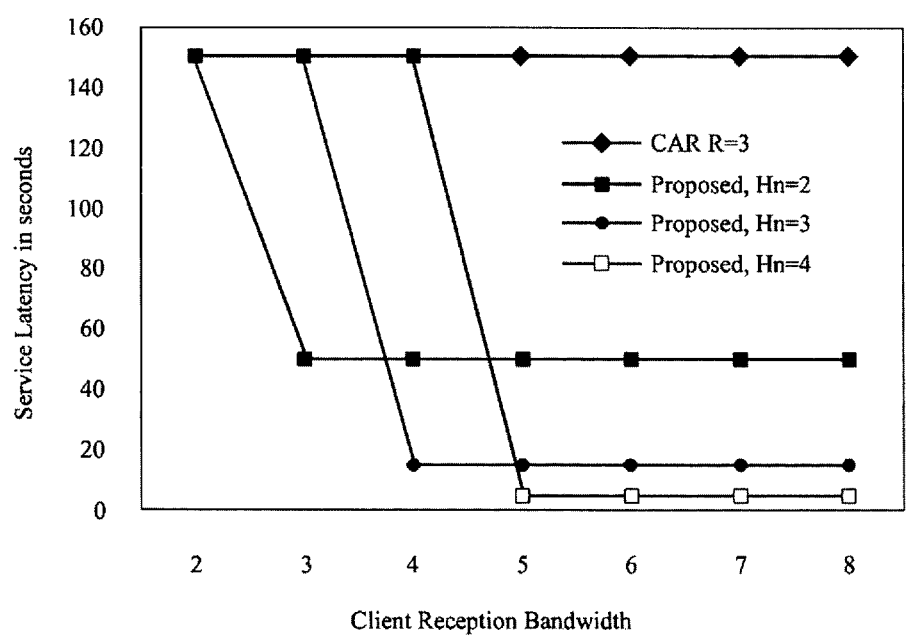
FIG. 4 is a graph showing the comparison using the CAR (R=3) scheme and the number of $H_N^{sb}$ according to the present invention.

FIGS. 3 and 4 show the comparison of the maximum service latencies of the terminals when 120 min. video contents are broadcast through nine regular server channels including two R channels and three R channels, respectively, using CAR, and through the sub-channels using the schemes suggested herein.

The maximum service latency depends on the size of the first segment. As seen from FIG. 3, the service latency is significantly improved for the high-end terminals even though there is not much improvement for the low-end terminals. When the sub-channels $H_N^{sb}$ for the first segment increase, the maximum service latency decreases. However, this means that the terminal bandwidth requirement also grows proportionally.

Referring to FIG. 4, when the number of the R channels increases, i.e., when the number of the R channels is more than two, the service latency for the low-end terminals decreases. Conversely, the service latency for the high-end terminals increases. Therefore, when the network has many low-end terminals, the service latency can be reduced by increasing the number of the R channels, scheduling the segments, and broadcasting the segments without using the sub-channels. On the contrary, for the network of many high-end terminals and large available bandwidth, the service latency can be improved for both the high-end and low-end terminals by increasing the sub-channels.

If only the sub-channels $\{H_1^{sb}, \ldots, H_N^{sb}\}$ which broadcast the first segment of the video in a divided manner are added, not all the terminals can receive the segments through the sub-channels because of the gap (difference) between the segments mentioned above. Meanwhile, if the rest of the sub-channels are added, the total bandwidth required to send all the segments is $(2K+H_N^{sb}-2)$ for R>0 and $(2K+H_N^{sb}-1)$ for R=0. Even for broadband networks, this will be quite a burden.

Figure 5:
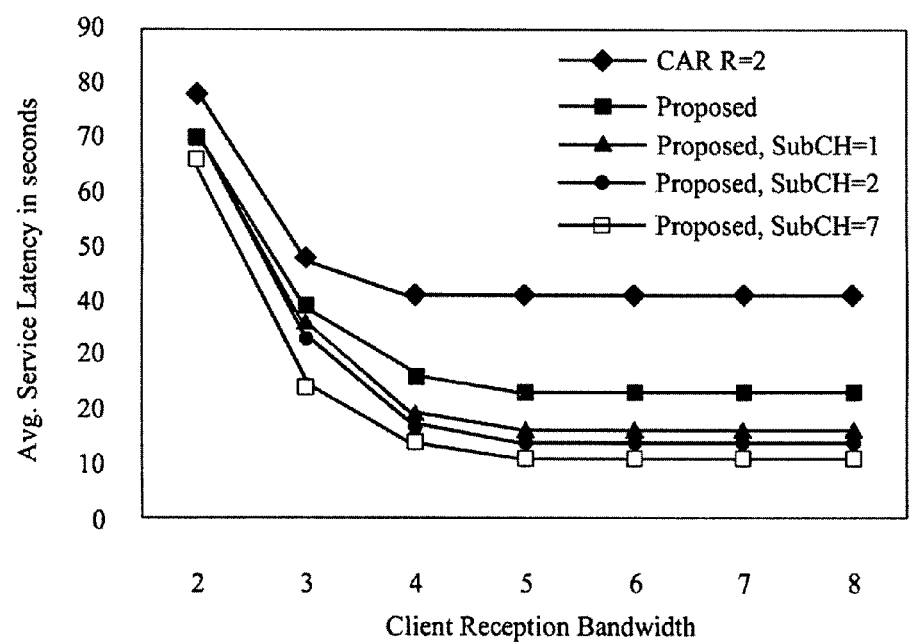
FIG. 5 is a graph showing the average service latencies of terminals according to the number of sub-channels added in the present invention.

FIG. 5 shows the average service latencies of one thousand terminals when the segments are broadcast through nine regular server channels.

The terminals make a request at an arbitrary time while 120 min. video is broadcast. It can be known from FIG. 5 that the average service latency is decreased by almost 50% just by adding the sub-channel $H_N^{sb}=2$ for the first segment and further decreased by adding the other sub-channels. As such, the intermediate nodes can determine how many sub-channels will be further added according to the network resource status.

The scope of the present invention is not limited to the embodiment described and illustrated above but is defined by the appended claims. It will be apparent that those skilled in the art can make various modifications and changes thereto within the scope of the invention defined by the claims. Therefore, the true scope of the present invention should be defined by the technical spirit of the appended claims.

What is claimed is:

1. A method for transmitting Near Video on Demand (NVoD) using Catch and Rest (CAR) and sub-channels, the method comprising:

dividing an L-sized content into N segments using the CAR broadcasting scheme, allocating the segments to K channels including a replicate channel, and broadcasting the segments;

dividing a first segment $S_1^R$ ($S_i^R$ represents an i-th segment of a regular channel) into $N^{sb}$ sub-segments again at given bandwidth using the harmonic broadcasting scheme, and dividing an i-th sub-segment $S_i^{sb}$ into i segments again;

broadcasting the sub-segments $[S_{i.1}^{sb}, \ldots, S_{i.i}^{sb}]$ in n sub-channels; and adding the segments $[S_2^R, \ldots, S_N^R]$ to a sub-layer and broadcasting the segments, the first segment broadcast in the first channel being divided and allocated to a number sub-channels, the succeeding segments broadcast in the other channels being just shifted and broadcast;

wherein sub-channels $[H_1^{sb}, \ldots, H_N^{sb}]$ for broadcasting the divided segments $[S_2^R, \ldots, S_N^R]$ are shifted by $S_1^{sb}$, and the other sub-channels are shifted by Offset(i) represented by the following equation:

$$Offset(i) = \begin{cases} 2 \times Period^R(i-1) & \text{if } 2 \leq i \leq K-2R-1 \\ Offset(i-1) + 3 \times Period^R(i-1) & \text{if } i = K-2R \\ Offset(i-1) + Period^R(i-1) & \text{in other cases} \end{cases}$$

wherein $Period^R(i)$ is a period of the regular channel to which each of i-th sub-channels corresponds.

2. The method of claim 1, wherein, if R>0, the first replicate channel is not transmitted to the sub-channel.

3. A method for transmitting Near Video on Demand (NVoD) using Catch and Rest (CAR) and sub-channels, the method comprising:

dividing an L-sized content into N segments using the CAR broadcasting scheme, allocating the segments to K channels including a replicate channel, and broadcasting the segments;

dividing a first segment $S_1^R$ ($S_i^R$ represents an i-th segment of a regular channel) into $N^{sb}$ sub-segments again at given bandwidth using the harmonic broadcasting scheme, and dividing an i-th sub-segment $S_i^{sb}$ into i segments again;

broadcasting the sub-segments $[S_{i.1}^{sb}, \ldots, S_{i.i}^{sb}]$ in n sub-channels; and adding the segments $[S_2^R, \ldots, S_N^R]$ sub-layer and broadcasting the segments, the first segment broadcast in the first channel being divided and allocated to a number sub-channels, the succeeding segments broadcast in the other channels being just shifted and broadcast;

wherein, if all the channels are added to the sub-layer, when bandwidth of one channel is b, the total bandwidth B needed is represented by the following equation:

$$B = \begin{cases} (2K + H_N^{sb} - 2) \times b & \text{if } R > 0 \\ (2K + H_N^{sb} - 1) \times b & \text{if } R = 0. \end{cases}$$

4. A method for transmitting Near Video on Demand (NVoD) using Catch and Rest (CAR) and sub-channels, the method comprising:

dividing an L-sized content into N segments using the CAR broadcasting scheme, allocating the segments to K channels including a replicate channel, and broadcasting the segments;

dividing a first segment $S_1^R$ ($S_i^R$ represents an i-th segment of a regular channel) into $N^{sb}$ sub-segments again at given bandwidth using the harmonic broadcasting scheme, and dividing an i-th sub-segment $S_i^{sb}$ into i segments again;

broadcasting the sub-segments $[S_{i.1}^{sb}, \ldots, S_{i.i}^{sb}]$ in n sub-channels; and adding the segments $[S_2^R, \ldots, S_N^R]$ to a sub-layer and broadcasting the segments, the first segment broadcast in the first channel being divided and allocated to a number sub-channels, the succeeding segments broadcast in the other channels being just shifted and broadcast;

wherein, if the number of the segments of the sub-channel is $N_{sb}$ and the number of the segments of the regular channel is $N_R$, the maximum service latency d for the terminal is represented by the following equation:

$$d = \frac{L}{(2^{K-2R-3}(3(2^{R+1}-1)+4)-1) \times e^{H_N^{sb}-C}} = \frac{L}{N_R \times N_{sb}}.$$

* * * * *